(12) United States Patent
Kim

(10) Patent No.: US 9,484,769 B2
(45) Date of Patent: Nov. 1, 2016

(54) CASE HAVING WIRELESS CHARGING RECEIVER PAD FOR ELECTRONIC DEVICES

(71) Applicant: SPIGEN KOREA CO, LTD., Seoul (KR)

(72) Inventor: Dae-Young Kim, Seoul (KR)

(73) Assignee: SPIGEN KOREA CO., LTD., Geumcheon-Gu, Seoul (KR)

( * ) Notice: Subject to any disclaimer, the term of this patent is extended or adjusted under 35 U.S.C. 154(b) by 0 days.

(21) Appl. No.: 15/081,882

(22) Filed: Mar. 26, 2016

(65) Prior Publication Data

US 2016/0285301 A1  Sep. 29, 2016

Related U.S. Application Data

(60) Provisional application No. 62/138,852, filed on Mar. 26, 2015.

(51) Int. Cl.
*H02J 7/02* (2016.01)
*H02J 7/00* (2006.01)
*H02J 17/00* (2006.01)

(52) U.S. Cl.
CPC .............. *H02J 7/025* (2013.01); *H02J 7/0044* (2013.01); *H02J 17/00* (2013.01); *H02J 50/00* (2016.02); *H02J 50/10* (2016.02)

(58) Field of Classification Search
CPC ........ H02J 7/025; H02J 7/0044; H02J 50/00; H02J 50/10; H02J 17/00

USPC ......................................................... 320/108
See application file for complete search history.

(56) References Cited

U.S. PATENT DOCUMENTS

| | | | | |
|---|---|---|---|---|
| 2011/0050164 | A1* | 3/2011 | Partovi | H01F 5/003 320/108 |
| 2013/0300352 | A1* | 11/2013 | Kuk | H02J 7/025 320/108 |
| 2014/0239916 | A1* | 8/2014 | To | H02J 7/0042 320/137 |

\* cited by examiner

*Primary Examiner* — Nathaniel Pelton
(74) *Attorney, Agent, or Firm* — East West Law Group; Heedong Chae

(57) ABSTRACT

A case for a portable electronic device includes a soft protective case, a hard protective frame, and a wireless charging receiver pad stored in a pad opening of the soft protective case. The pad opening has first, second, third and fourth walls such that the first and second walls face each other and the third and fourth walls face each other. Upper portions of the first and second walls are slanted to same directions and lower portions of the first and second walls are slanted to same directions whereas the upper and lower portions of the first wall are slanted in opposite directions. In addition, left and right portions of the third wall are slanted in opposite directions and left and right portions of the fourth wall are slanted in opposite directions as well. The right portions of the third and fourth walls are slanted in same directions.

20 Claims, 9 Drawing Sheets

US 9,484,769 B2

CASE HAVING WIRELESS CHARGING RECEIVER PAD FOR ELECTRONIC DEVICES

CROSS-REFERENCE TO RELATED APPLICATIONS

This application claims priority to U.S. provisional patent application No. 62/138,852 filed Mar. 26, 2015, which is incorporated herein by reference.

FIELD OF THE INVENTION

The present invention relates to a case having, a wireless charging receiver pad, for an electronic device and, more particularly, to a mobile phone case having a soft protective case, a hard protective frame and a wireless charging receiver pad stored in a pad opening of the soft protective case.

BACKGROUND OF THE INVENTION

Portable electronic devices, such as mobile phones, smart phones, tablet computers and the like, have become popular and widely used for communication, entertainment purposes and other purposes. These electronic devices are intended to be carried or moved about and as such, these devices are more likely to be accidentally dropped, hit, or scratched. To protect the portable electronic devices, protective cases have been introduced and become popular in connection with the electronic devices such as cell phones, smart phones, tablet computers and the like.

Portable electronic devices are generally battery powered, and the battery has a limited life and needs to be recharged. To extend the battery life, some people carry an extra battery so that they can replace a battery when it becomes discharged. However, separately carrying an extra battery is cumbersome and inconvenient.

Recently, wireless charging, also known as inductive charging, has been introduced and some portable devices have adopted a wireless charging system. Wireless charging uses an electromagnetic field to transfer energy between a wireless charger and a wireless receiver unit. The wireless charger has a transmitter coil and the wireless receiver unit has a receiver coil. Energy is transferred from the transmitter coil to the receiver coil through an inductive coupling. The wireless charger is connected to a power source and the energy transferred to the receiver coil is converted into electrical current to charge a battery of the wireless receiver unit.

Wireless charging has been introduced to provide an extra battery for portable electronic devices. Wireless charging module is comprised of a wireless charging base and a wireless charging receiver pad. The wireless charging receiver pad has a battery which can be charged by the wireless charging base. The wireless charging receiver pad can be connected to a charging port of a portable electronic device to provide power to the portable electronic device.

Carrying a wireless charging receiver pad is cumbersome and inconvenient and thus, a wireless charging receiver pad attachable to a portable electronic device has been introduced. By attaching a wireless charging receiver pad to a portable electronic device, it has become easy to carry both of them and it is easy to recharge the wireless charging receiver pad simply by placing it on a wireless charging base which is connected to a power source.

However, a wireless charging receiver pad attached to a portable electronic device deforms the shape of a case and the protective performance of the case is undermined.

Therefore, to solve the above problems, there is a need for a case for an electronic device having a wireless charging receiver pad, integrated into the structure of the case. This invention is directed to solve these problems and satisfy the long-felt need.

SUMMARY OF THE INVENTION

The present invention contrives to solve the disadvantages of the prior art. The present invention provides a case, having a wireless charging receiver pad, for an electronic device and, more particularly, to a mobile phone case having a soft protective case, a hard protective frame and a wireless charging receiver pad stored in a pad opening of the soft protective case.

The object of the invention is to provide a case for an electronic device, comprising: a soft protective case which comprises a back panel to cover a back portion of the electronic device, and a side wall extending from the back panel along edges of the back panel to cover a side portion of the electronic device; a hard protective frame, constructed to removably mount over the soft protective case; a wireless charging receiver pad having a plug and a plug cable; a pad opening formed on the back panel of the soft protective cover to receive the wireless charging receiver pad therein; and a plug cable opening formed on the soft protective case wherein the plug cable passes through the plug cable opening. The hard protective frame covers the pad opening to make the wireless charging receiver pad not visible from outside.

Another object of the invention is to provide a case, having a soft protective case, a hard protective frame, and a wireless charging receiver pad stored in a pad opening of the soft protective case. The pad opening has first, second, third and fourth walls such that the first and second walls face each other and the third and fourth walls face each other. Upper portions of the first and second walls are slanted to same directions and lower portions of the first and second walls are slanted to same directions whereas the upper and lower portions of the first wall are slanted in opposite directions. In addition, left and right portions of the third wall are slanted in opposite directions and left and right portions of the fourth wall are slanted in opposite directions as well. The left portions of the third and fourth walls are slanted in same directions and the right portions of the third and fourth walls are slanted in same directions.

Still another object of the invention is to provide a case for an electronic device, having: a soft protective case which comprises a back panel to cover a back portion of the electronic device, and a side wall extending from the back panel along edges of the back panel to cover a side portion of the electronic device; a hard protective frame, constructed to removably mount over the soft protective case; a wireless charging receiver pad having a plug and a plug cable; a pad opening formed on the back panel of the soft protective cover to receive the wireless charging receiver pad therein; and a plug cable opening formed on the soft protective case wherein a plug cable opening is sized in that the plug cable can pass through the plug cable opening, but the wireless charging receiver pad cannot pass through the plug cable opening. The hard protective frame covers the pad opening to make the wireless charging receiver pad not visible from outside. The pad opening comprises a first wall, a second wall, a third wall, and a fourth wall wherein the first and second walls face each other and the third and fourth walls face each other. The first wall comprises a first portion and a second portion and the second wall comprises a first portion and a second portion in that the first portions of the first wall and the second wall face each other and the second portions of the first wall and the second wall face each other. The first and second portions of the first wall are slanted in opposite directions, and the first and second portions of the second wall are slanted in opposite directions. In addition, the first portions of the first and second walls are slanted in same directions, and the second portions of the first and second walls are slanted in same directions.

Still another object of the invention is to provide a case for an electronic device, comprising: a soft protective case which comprises a back panel to cover a back portion of the electronic device, and a side wall extending from the back panel along edges of the back panel to cover a side portion of the electronic device; a hard protective frame, constructed to removably mount over the soft protective case; a wireless charging receiver pad having a plug and a plug cable; a pad recess (not shown) formed on the back panel of the soft protective cover to receive the wireless charging receiver pad therein; and a plug cable opening formed on the soft protective case wherein the plug cable passes through the plug cable opening. The pad recess may be formed on top surface or bottom surface of the back panel.

The advantages of the present invention are: (1) the case having a wireless charging receiver pad of the present invention provides a protection and an extra battery to a portable electronic; (2) the case of the present invention has one compact, stylish, and integrated structure of the case and the wireless charging receiver pad; (3) it is very convenient to recharge the wireless charging receiver pad by simply placing it onto a wireless charger; and (4) because of the slant structure of walls of the pad opening, the wireless charging receiver pad does not stick in between the soft protective case and the portable electronic device or in between the soft protective case and hard protective frame.

Although the present invention is briefly summarized, the fuller understanding of the invention can be obtained by the following drawings, detailed description and appended claims.

BRIEF DESCRIPTION OF THE DRAWINGS

These and other features, aspects and advantages of the present invention will become better understood with reference to the accompanying drawings, wherein.

DETAILED DESCRIPTION EMBODIMENTS OF THE INVENTION

Reference will now be made in detail to the preferred embodiments of the present invention, examples of which are illustrated in the accompanying drawings, which form a part of this disclosure. It is to be understood that this invention is not limited to the specific devices, methods, conditions or parameters described and/or shown herein, and that the terminology used herein is for the purpose of describing particular embodiments by way of example only and is not intended to be limiting of the claimed invention.

Also, as used an the specification including the appended claims, the singular forms "a", "an", and "the" include the plural, and reference to a particular numerical value includes at least that particular value, unless the context clearly dictates otherwise. Ranges may be expressed herein as from "about" or "approximately" one particular value and/or to "about" or "approximately" another particular value. When such a range is expressed, another embodiment includes from the one particular value and/or to the other particular value. Similarly, when values are expressed as approximations, by use of the antecedent "about", it will be understood that the particular value forms another embodiment.

Figure 1:
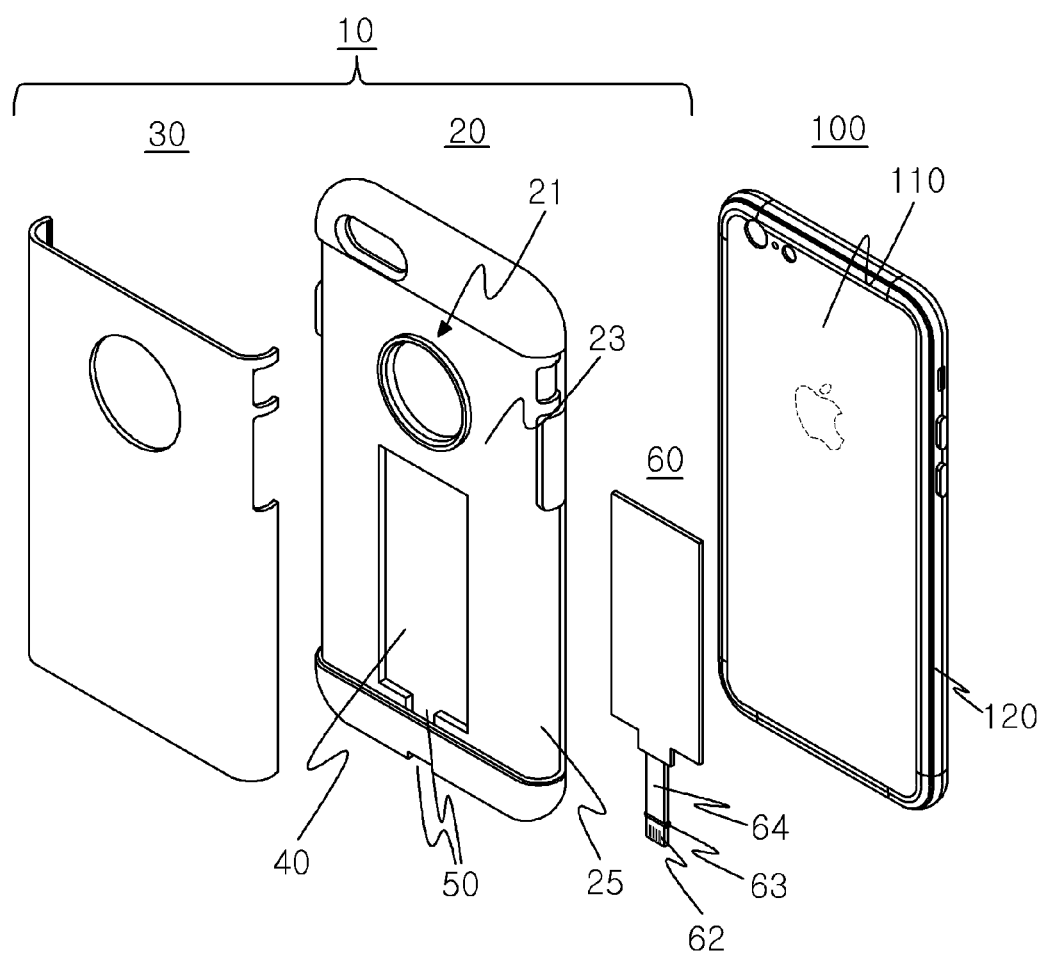
FIG. 1 shows an exploded view of a case with a wireless charging receiver pad according to one embodiment of the present invention.
Figure 2:
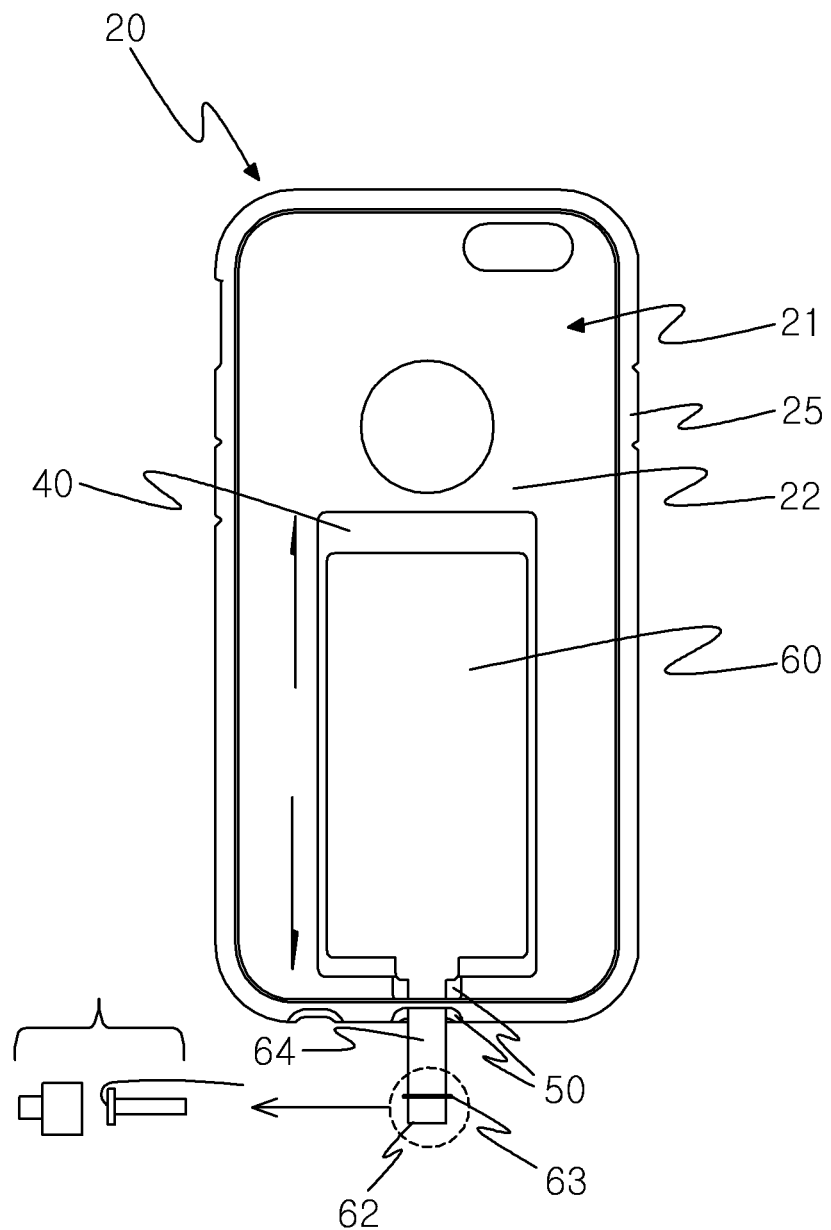
FIG. 2 shows a front elevational view of a soft protective case with the wireless charging receiver pad therein according to one embodiment of the present invention.
Figure 3:
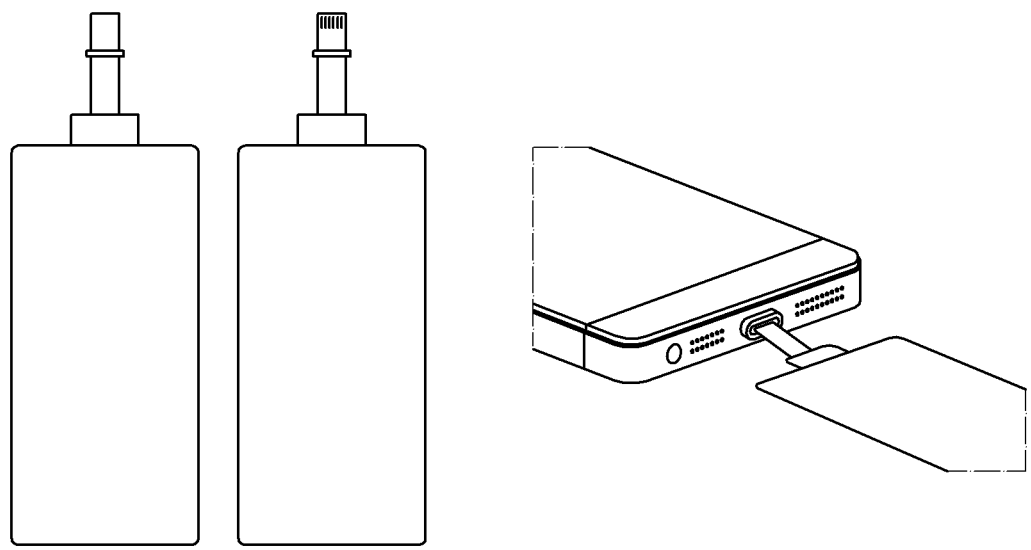
FIG. 3 shows an example of a wireless charging receiver pad which is connected to a portable electronic device.

FIG. 1 shows an exploded view of a case 10 with a wireless charging receiver pad 60 according to one embodiment of the present invention, and FIG. 2 shows a front elevational view of a soft protective case 20 with the wireless charging receiver pad 60. In addition, FIG. 3 shows an example of the wireless charging receiver pad 60 which is connected to a portable electronic device 100.

A case 10 for an electronic device 100 comprises: a soft protective case 20 which comprises a back panel 21 to cover a back portion 110 of the electronic device 100, and a side wall 25 extending from the back panel 21 along edges of the back panel 21 to cover a side portion 120 of the electronic device 100; a hard protective frame 30, constructed to removably mount over the soft protective case 20; a wireless charging receiver pad 60 having a plug 62 and a plug cable 64; a pad opening 40 formed on the back panel 21 of the soft protective cover 20 to receive the wireless charging receiver pad 60 therein; and a plug cable opening 50 formed on the soft protective case 20 wherein a plug cable opening 50 is sized in that the plug cable 64 can pass through the plug cable opening 50, but the wireless charging receiver pad 60 cannot pass through the plug cable opening 50. The hard protective frame 30 covers the pad opening 40 to make the wireless charging receiver pad 60 not visible from outside.

The length of the pad opening 40 is greater than that of the wireless charging receiver pad 60 so that the wireless charging receiver pad 60 can move forward and backward in the pad opening 40. However, the width of the pad opening 40 is only slightly greater than or about the same as the width of the wireless charging receiver pad 60 so that the wireless charging receiver pad 60 is held in the pad opening 40 by a friction fit between the wireless charging receiver pad 60 and the side walls 41 and 42 of the pad opening 40. Accordingly, a user can slide forward and backward the wireless charging receiver pad 60 with respect to the pad opening 40. The plug cable opening 50 is formed on the back panel 21 and the side wall 25 for pass through of the plug cable 64.

The plug 62 of the wireless charging receiver pad 60 can be connected to a charging port of the portable electronic device 100 to supply power to the device 100 and the charging port of the device 100 may be also connected to other chargers. A user can conveniently place the case 10 on a wireless charging base (not shown) to re-charge the wireless charging receiver pad 60.

The hard protective frame 30 is constructed to cover the pad opening 40 to make it not visible from outside. As in FIG. 1, the hard protective frame 30 covers the back panel 21 and side wall 25 of the soft protective case 20. In addition, the soft protective cover 20 is preferably made of thermoplastic polyurethane and the hard protective frame 30 is preferably made of polycarbonate or other plastic.

Figure 4:
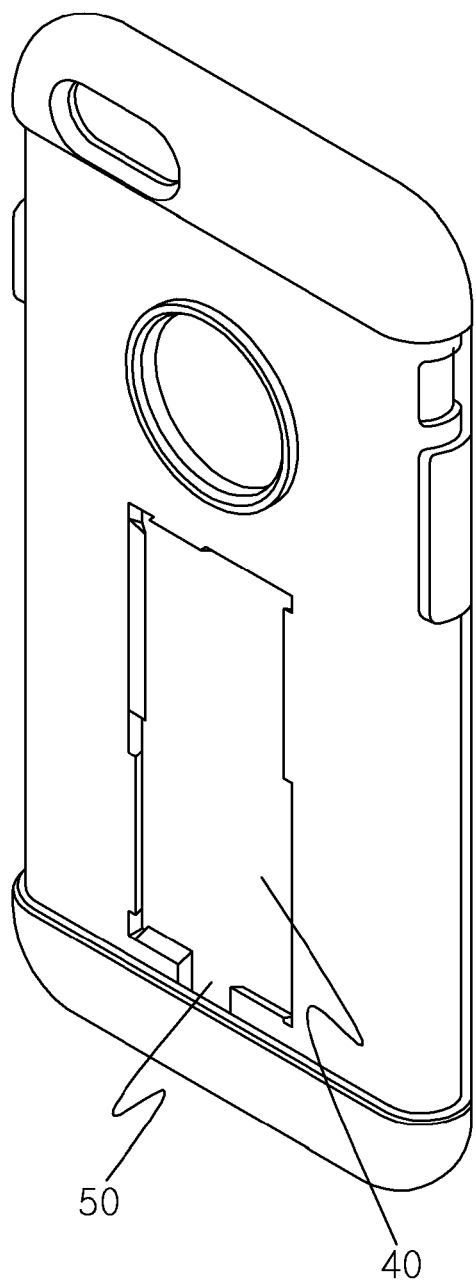
FIG. 4 shows a rear perspective view of the soft protective case according to the present invention
Figure 5:
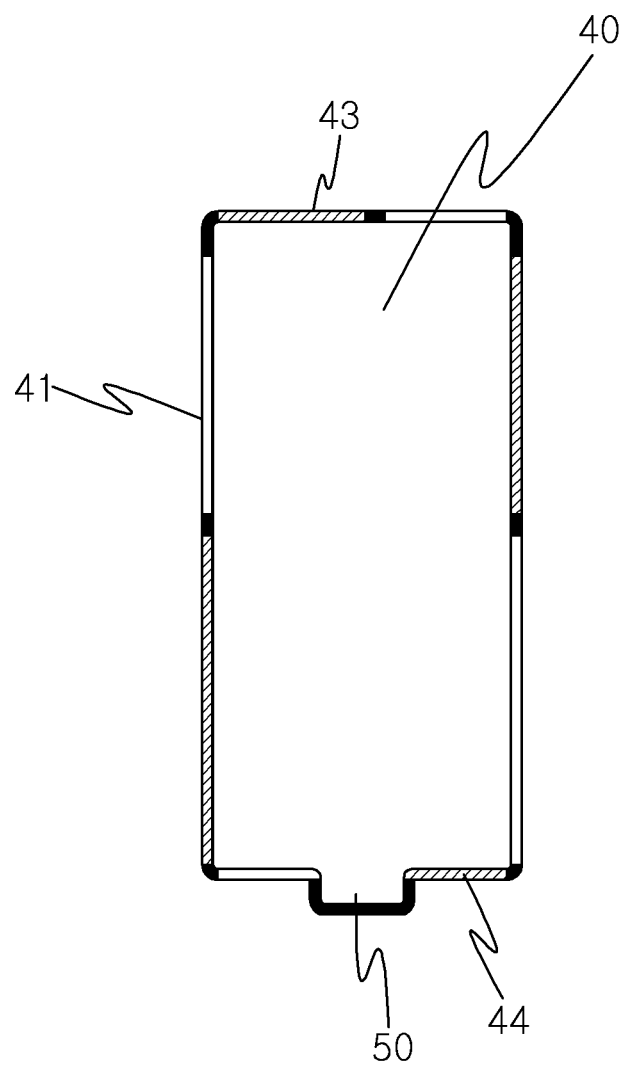
FIG. 5 shows a schematic view of the pad opening.
Figure 6:
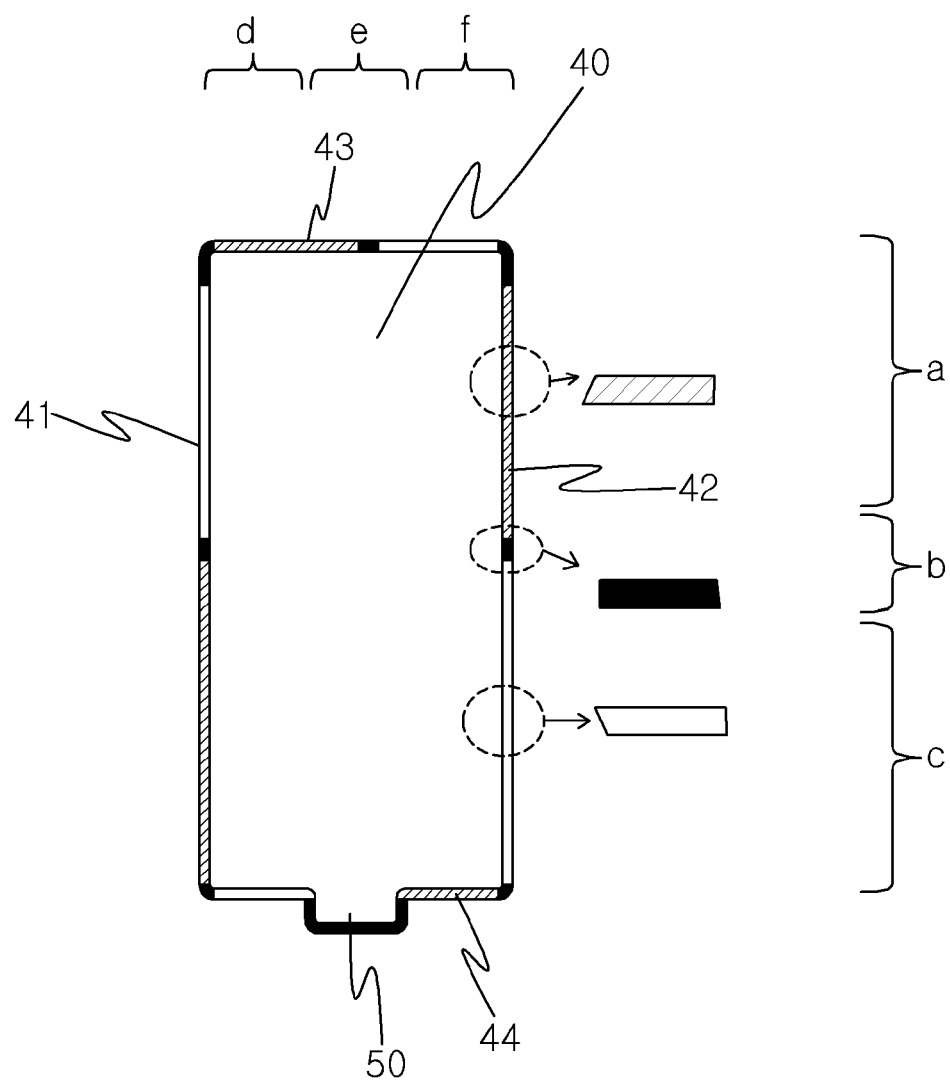
FIG. 6 shows a schematic view of the pad opening illustrating wall slants of the pad opening according to the present invention.

FIG. 4 shows a rear perspective view of the soft protective case 20. FIGS. 5 and 6 are schematic views of the pad opening 40 illustrating wall slant directions of the pad opening 40.

The pad opening 40 comprises a first wall 41, a second wall 42, a third wall 43, and a fourth wall 44 wherein the first and second walls 41 and 42 face each other and the third and fourth walls 43 and 44 face each other. The plug cable opening 50 is formed on the fourth wall 44 and divides the fourth wall 44 into left and right portions (d), (f) of the fourth wall 44. The third wall 43 comprises left and right portions (d), (f) of the third wall 43 which respectively face left and right (d), (f) portions of the fourth wall 44. In addition, the first and second walls 41 and 42 respectively comprise upper, middle and lower portions (a), (b), (c).

As illustrated in FIG. 6, part of the first wall 41 is slanted and part of the second wall 42 is slanted as well. In addition, the pad opening 40 is sized in that the wireless charging receiver pad 60 moves forward and backward within the pad opening 40.

While the wireless charging receiver pad 60 moves up and down the pad opening 40, it 60 may be stuck in between the soft protective cover 20 and portable electronic device 100 or between the soft protective cover 20 and hard protective frame 30 because edges of the wireless charging receiver pad 60 are thin. This problem can be prevented by the slanted structure of the pad opening walls 41, 42, 43 and/or 44.

FIG. 6 shows cross-sectional views of the walls respectively illustrated for different portions. This is example only and different construction may apply. For examples, the walls may be substantially vertical.

Preferably, as shown in FIG. 6, the upper and lower portions (a), (c) of the first wall 41 may be slanted in opposite directions and the upper and lower portions (a), (c) of the second wall 42 may be slanted in opposite directions as well.

The upper portions (a) of the first and second walls 41, 42 may be slanted in same directions and the lower portions (c) of the first and second walls 41, 42 may be slanted in same directions as well.

While the wireless charging receiver pad 60 moves forward and backing within the pad opening 40, the wireless charging receiver pad 60 may be stuck in between the soft protective case 20 and the portable electronic device 100 or in between the soft protective case 20 and hard protective frame 30. However, because of the slant structure of walls of the pad opening, the wireless charging receiver pad 60 does not stick in between the soft protective case 20 and the portable electronic device 100 or in between the soft protective case 20 and hard protective frame 30.

Figure 7:
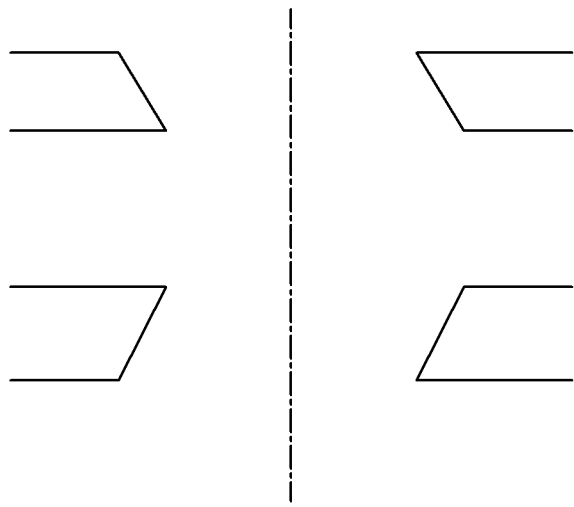
FIG. 7 shows a schematic cross-sectional view of walls illustrating slants in the same directions.

FIG. 7 shows examples of cross-sectional view of the walls in that the walls are slanted in the same directions. In the upper example, the walls are sloped to have negative slopes and thus, they are slanted in the same directions. In the lower example, the walls are slanted to have positive slopes and thus, they are slanted in the same directions as well.

Figure 8:
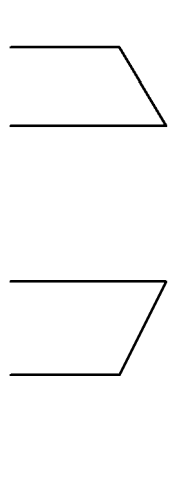
FIG. 8 shows a schematic cross-sectional view of walls illustrating slants in the opposite directions.

FIG. 8 shows an example of cross-sectional view of the walls in that the walls are slanted in the opposite directions. Here, the walls are slanted, upper one having a negative slope and lower one having a positive slope, and thus they are slanted in opposite directions. According to this definition, in FIG. 7, the walls in the same columns are slanted in opposite directions.

Figure 9:
FIG. 9 shows a schematic cross-sectional view of a wall which is not slanted or substantially vertical.

FIG. 9 shows a wall which is not slanted, but instead, substantially vertical. Here, "not slanted" means "substantially vertical".

As in FIG. 6, the middle portions (b) of the first and second walls 41 and 42 are not slanted.

Part of the third wall 43 is slanted and part of the fourth wall 44 is slanted. The left and right portions (d), (f) of the third wall 43 may be slanted in opposite directions, and the left and right portions (d), (f) of the fourth wall 44 may be slanted in opposite directions as well. In addition, the left portions (d) of the third and fourth walls 43 and 44 may be slanted in same directions. The right portions (f) of the third and fourth walls 43 and 44 may also be slanted in same directions.

Middle portion (e) of the third wall 43 may not be slanted. Furthermore, a portion bordering the first and third walls 41 and 43 may not be slanted and a portion bordering the second and third walls 42 and 43 may not be slanted.

A portion bordering the first and fourth walls 41 and 44 may not be slanted and a portion bordering the second and fourth walls 42 and 44 may not be slanted.

FIG. 4 shows slant structure of the walls in preferred embodiment.

As in FIG. 2, a protrusion 63 may be formed on a plug cable 64 so that a user can conveniently pull out the wireless charging receiver pad 60 using his/her finger. There may be a plug holder between the plug 62 and protrusion 63 as shown in FIG. 2. The plug holder is large enough for a user to hold for insertion of the plug 62 into a charging port of the device 100.

The plug cable 64, protrusion 63, and/or plug holder may be made of plastic or flexible material which is usually used to make mats.

Figure 10:
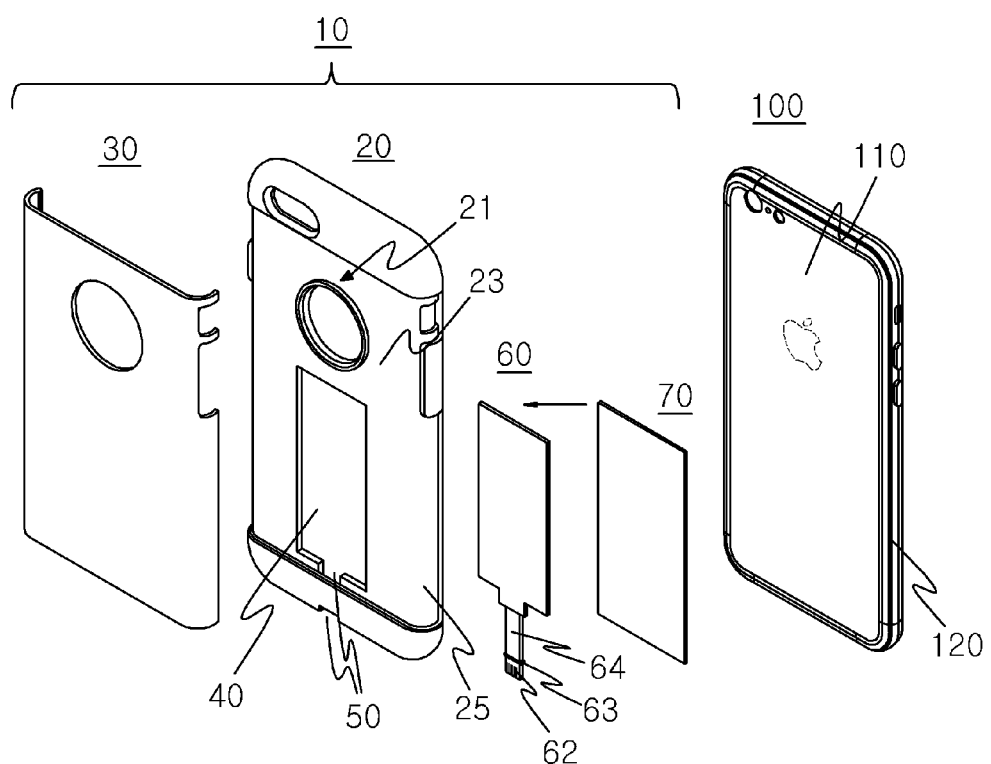
FIG. 10 shows an exploded view of a case with a wireless charging receiver pad according to another embodiment of the present invention.
Figure 11:
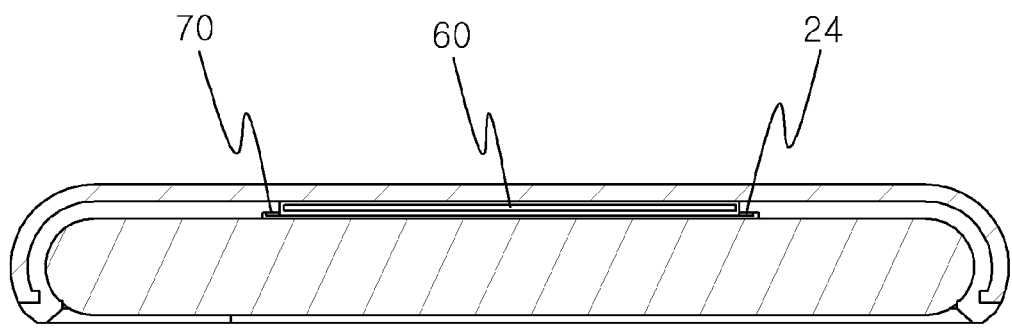
FIG. 11 shows a cross-sectional view according to another embodiment of the present invention.

FIG. 10 shows an exploded view of a case 10 with a wireless charging receiver pad 60 according to still another embodiment of the present invention, and FIG. 11 shows a cross-sectional view thereof.

In this embodiment, the case 10 further comprises a cover 70 for covering the pad opening 40 and the wireless charging receiver pad 60 secured in the pad opening 40.

A mounting recess 24 may be formed on a top surface 22 of the back panel 21 and the mounting recess 24 is constructed such that the cover 70 can mount on the mounting recess 24 for covering the pad opening 40 and the wireless charging receiver pad 60.

Preferably, the mounting recess 24 is formed on the top surface 22 of the back panel 21 along edges of the pad opening 40 and the cover 70 mounts on the mounting recess along the edges of the pad opening 40. The cover 70 may be fixedly attached to the mounting recess 24 using an attachment means such as adhesive, glue, bonding material, bonding tape or the like. Alternatively, there may be a coupling means for the cover 70 to detachably attach to the soft protective case 20. For example, there may be coupling protrusion and recess for locking the cover 70 to the soft protective case 20.

The cover 70 is preferably substantially flush with or co-planar with the top surface 22 of the back panel 21. The cover 70 protects the electronic device 100 from a scratch by the wireless charging receiver pad 60. In addition, the cover 70 may be made of PVC (polyvinyl chloride), PET (polyethylene terephthalate), PC (polycarbonate), TPU (thermoplastic polyurethane) or the like.

The walls of the pad opening 40 may have the structure as shown above in FIGS. 4 and 6. The walls may have different structures. For examples, the walls may be substantially vertical.

In still another embodiment of the present invention, a case 10 for an electronic device 100 comprises: a soft protective case 20 which comprises a back panel 21 to cover a back portion 110 of the electronic device 100, and a side wall 25 extending from the back panel 21 along edges of the back panel 21 to cover a side portion 120 of the electronic device 100; a hard protective frame 30, constructed to removably mount over the soft protective case 20; a wireless charging receiver pad 60 having a plug 62 and a plug cable 64; a pad opening 40 formed on the back panel 21 of the soft protective case 20 to receive the wireless charging receiver pad 60 therein; and a plug cable opening 50 formed on the soft protective case 20 wherein a plug cable opening 50 is sized in that the plug cable 64 can pass through the plug cable opening 50, but the wireless charging receiver pad 60 cannot pass through the plug cable opening 50. The hard protective frame 30 covers the pad opening 40 to make the wireless charging receiver pad 60 not visible from outside.

The pad opening 40 comprises a first wall 41, a second wall 42, a third wall 43, and a fourth wall 44 wherein the first and second walls 41, 42 face each other and the third and fourth walls 43, 44 face each other. In addition, the first wall 41 comprises a first portion and a second portion (not shown) and the second wall 42 comprises a first portion and a second portion in that the first portions of the first wall 41 and the second wall 42 face each other and the second portions of the first wall 41 and the second wall 42 face each other. Preferably, the first and second portions of the first wall 41 are slanted in opposite directions, and the first and second portions of the second wall 42 are slanted in opposite directions as well. Furthermore, the first portions of the first and second walls 41, 42 may be slanted in same directions, and the second portions of the first and second walls 41, 42 may be slanted in same directions. In addition, the pad opening 40 is sized in that the wireless charging receiver pad 60 moves forward and backward within the pad opening 40.

The third and fourth walls 43, 44 respectively comprise third and fourth portions (not shown) in that the third portions of the third and fourth walls 43, 44 face each other and the fourth portions of the third and fourth walls 43, 44 face each other.

In other words, in the embodiment, there is no middle portion compared to the previous embodiment.

Preferably, the third portions of the third and fourth walls 43, 44 are slanted in same direction and the fourth portions of the third and fourth walls 43, 44 are slanted in same direction.

Divisions of a wall into upper, middle and lower portions; left, middle, and right portions; first and second portions; and third and fourth portions are only example only and the present invention is not limited to such examples, and there may be other examples. For example, a wall may further include other portion(s).

In still another embodiment of the present invention, a pad recess 40' (not shown), instead of a pad opening 40', may be formed on the soft protective case 20 to receive the wireless charging receiver pad 60.

A case 10 for an electronic device 100 comprises: a soft protective case 20 which comprises a back panel 21 to cover a back portion 110 of the electronic device 100, and a side wall 25 extending from the back panel 21 along edges of the back panel 21 to cover a side portion 120 of the electronic device 100; a hard protective frame 30, constructed to removably mount over the soft protective case 20; a wireless charging receiver pad 60 having a plug 62 and a plug cable 64; a pad recess 40' (not shown) formed on the back panel 21 of the soft protective case 20 to receive the wireless charging receiver pad 50 therein; and a plug cable opening 50 formed on the soft protective case 20 wherein the plug cable 64 passes through the plug cable opening 50. The hard protective frame 30 covers the pad opening 40 to make the wireless charging receiver pad 60 not visible from outside.

The pad recess 40' may be formed on a top surface 22 of the back panel 21 such that the top surface 22 faces the electronic device 100. Alternatively, the pad recess 40' may be formed on a bottom surface 23 of the back panel 21 such that the bottom surface 23 faces the hard protective frame 30.

The wall slant structures or examples described above are applicable to this embodiment having the pad recess 40', For example, the pad recess (40') is sized in that the wireless charging receiver pad (60) moves forward and backward within the pad recess (40'), wherein the pad recess (40') comprises a first wall (41), a second wall (42), a third wall (43), and a fourth wall (44) wherein part of the first wall (41) is slanted and part of the second wall (42) is slanted, wherein part of the third wall (43) is slanted and part of the fourth wall (44) is slanted.

While the invention has been shown and described with reference to different embodiments thereof, it will be appreciated by those skilled in the art that variations in form, detail, compositions and operation may be made without departing from the spirit and scope of the invention as defined by the accompanying claims.

The invention claimed is:

1. A case (10) for an electronic device (100), comprising:
a soft protective case (20) which comprises a back panel (21) to cover a back portion (110) of the electronic device (100), and a side wall (25) extending from the back panel (21) along edges of the back panel (21) to cover a side portion (120) of the electronic device (100);
a hard protective frame (30), constructed to removably mount over the soft protective case (20);
a wireless charging receiver pad (60) having a plug (62) and a plug cable (64);
a pad opening (40) formed on the back panel (21) of the soft protective case (20) to receive the wireless charging receiver pad (60) therein; and
a plug cable opening (50) formed on the soft protective case (20) wherein a plug cable opening (50) is sized in that the plug cable (64) can pass through the plug cable opening 50, but the wireless charging receiver pad (60) cannot pass through the plug cable opening (50), wherein the hard protective frame (30) covers the pad opening (40).

2. The case (10) of claim 1, wherein the pad opening (40) comprises a first wall (41), a second wall (42), a third wall (43), and a fourth wall (44) wherein the first and second walls (41), (42) face each other and the third and fourth walls (43), (44) face each other, wherein the plug cable opening (50) is formed on the fourth wall (44), dividing the fourth wall (44) into left and right portions (d), (f) of the fourth wall (44), wherein the third wall (43) comprises left, middle and right portions (d), (e), (f) wherein left and right portions (d), (f) of the third wall (43) respectively face left and right portions (d), (f) of the fourth wall (44), wherein the first and second walls (41) and (42) respectively comprise upper, middle and lower portions (a), (b), (c), wherein the pad opening (40) is sized in that the wireless charging receiver pad (60) moves forward and backward within the pad opening (40), wherein part of the first wall (41) is slanted and part of the second wall (42) is slanted.

3. The case (10) of claim 2, wherein the upper and lower portions (a), (c) of the first wall (41) are slanted in opposite directions, and
wherein the upper and lower portions (a), (c) of the second wall (42) are slanted in opposite directions.

4. The case (10) of claim 3, wherein the upper portions (a) of the first and second walls (41), (42) are slanted in same directions, and
wherein the lower portions (c) of the first and second walls (41), (42) are slanted in same directions.

5. The case (10) of claim 2, wherein the middle portions (b) of the first and second walls (41), (42) are not slanted.

6. The case (10) of claim 2, wherein part of the third wall (43) is slanted and part of the fourth wall (44) is slanted.

7. The case (10) of claim 6, wherein the left and right portions (d), (f) of the third wall (43) are slanted in opposite directions, and
wherein the left and right portions (d), (f) of the fourth wall (44) are slanted in opposite directions.

8. The case (10) of claim 7, wherein the left portions (d) of the third and fourth walls (43) and (44) are slanted in same directions, and
wherein the right portions (f) of the third and fourth walls (43), (44) are slanted in same directions.

9. The case (10) of claim 8, wherein middle portion of the third wall (43) is not slanted.

10. The case (10) of claim 2, wherein a portion bordering the first and third walls (41), (43) is not slanted and a portion bordering the second and third walls (42), (43) is not slanted, and
wherein a portion bordering the first and fourth walls (41), (44) is not slanted and a portion bordering the second and fourth walls (42), (44) is not slanted.

11. The case (10) of claim 1, wherein width of the pad opening (40) is slightly greater than or about same as width of the wireless charging receiver pad (60) so that the wireless charging receiver pad (60) is held in the pad opening (40) by a friction fit.

12. The case (10) of claim 1, further comprising a cover (70) for covering the pad opening (40) and the wireless charging receiver pad (60) secured in the pad opening (40) from a direction of the electronic device (100).

13. The case (10) of claim 12, wherein a mounting recess (24) is formed on a top surface (22) of the back panel (21) along edges of the pad opening (40) and the cover (70) mounts on the mounting recess (24) along the edges of the pad opening (40),
wherein the cover (70) is substantially flush with or co-planar with the top surface (22) of the back panel (21).

14. The case (10) of claim 12, wherein the cover (70) is made of PVC (polyvinyl chloride), PET (polyethylene terephthalate), PC (polycarbonate), or TPU (thermoplastic polyurethane).

15. A case (10) for an electronic device (100), comprising:
a soft protective case (20) which comprises a back panel (21) to cover a back portion (110) of the electronic device (100), and a side wall (25) extending from the back panel (21) along edges of the back panel (21) to cover a side portion (120) of the electronic device (100);
a hard protective frame (30), constructed to removably mount over the soft protective case (20);
a wireless charging receiver pad (60) having a plug (62) and a plug cable (64);
a pad opening (40) formed on the back panel (21) of the soft protective case (20) to receive the wireless charging receiver pad (60) therein; and
a plug cable opening (50) formed on the soft protective case (20) wherein a plug cable opening (50) is sized in that the plug cable (64) can pass through the plug cable opening 50, but the wireless charging receiver pad (60) cannot pass through the plug cable opening (50),
wherein the hard protective frame (30) covers the pad opening (40),
wherein the pad opening (40) comprises a first wall (41), a second wall (42), a third wall (43), and a fourth wall (44) wherein the first and second walls (41), (42) face each other and the third and fourth walls (45), (44) face each other,
wherein the first wall (41) comprises a first portion and a second portion and the second wall (42) comprises a first portion and a second portion, wherein the first portions of the first wall (41) and the second wall (42) face each other and the second portions of the first wall (41) and the second wall (42) face each other,
wherein the pad opening (40) is sized in that the wireless charging receiver pad (60) moves forward and backward within the pad opening (40),
wherein the first and second portions of the first wall (41) are slanted in opposite directions,
wherein the first and second portions of the second wall (42) are slanted in opposite directions.

16. The case (10) of claim 15, wherein the first portions of the first and second walls (41), (42) are slanted in same directions, and
wherein the second portions of the first and second walls (41), (42) are slanted in same directions.

17. The case (10) of claim 15, wherein the third and fourth walls (43), (44) respectively comprise third and fourth portions,
wherein the third portions of the third and fourth walls (43), (44) face each other and the fourth portions of the third and fourth walls (43), (44) face each other,
wherein the third portions of the third and fourth walls (43), (44) are slanted in same direction and the fourth portions of the third and fourth walls (43), (44) are slanted in same direction.

18. A case (10) for an electronic device (100), comprising:
a soft protective case (20) which comprises a back panel (21) to cover a back portion (110) of the electronic device (100), and a side wall (25) extending from the back panel (21) along edges of the back panel (21) to cover a side portion (120) of the electronic device (100);
a hard protective frame (30), constructed to removably mount over the soft protective case (20);

a wireless charging receiver pad (60) having a plug (62) and a plug cable (64);

a pad recess (40') formed on the back panel (21) of the soft protective case (20) to receive the wireless charging receiver pad (60) therein; and a plug cable opening (50) formed on the soft protective case (20) wherein the plug cable (64) passes through the plug cable opening (50), wherein the hard protective frame (30) covers the pad opening (40).

19. The case (10) of claim 18, wherein the pad recess (40') is formed on a top surface (22) of the back panel (21) or the pad recess (40') is formed on a bottom surface (23) of the back panel (21).

20. The case (10) of claim 18, wherein the pad recess (40') is sized in that the wireless charging receiver pad (60) moves forward and backward within the pad recess (40'), wherein the pad recess (40') comprises a first wall (41), a second wall (42), a third wall (43), and a fourth wall (44) wherein part of the first wall (41) is slanted and part of the second wall (42) is slanted, wherein part of the third wall (43) is slanted and part of the fourth wall (44) is slanted.

\* \* \* \* \*